US012791434B2

(12) United States Patent
Gotoh

(10) Patent No.: US 12,791,434 B2
(45) Date of Patent: Nov. 10, 2026

(54) ATTACHMENT CHECKING DEVICE AND ATTACHMENT CHECKING METHOD

(71) Applicant: HONDA MOTOR CO., LTD., Tokyo (JP)

(72) Inventor: Hiroshi Gotoh, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 291 days.

(21) Appl. No.: 18/438,639

(22) Filed: Feb. 12, 2024

(65) Prior Publication Data

US 2024/0328897 A1 Oct. 3, 2024

(30) Foreign Application Priority Data

Mar. 30, 2023 (JP) ................................ 2023-054870

(51) Int. Cl.
*G01M 13/00* (2019.01)
*G01M 13/02* (2019.01)
*G01M 13/021* (2019.01)

(52) U.S. Cl.
CPC ............ *G01M 13/00* (2013.01); *G01M 13/02* (2013.01); *G01M 13/021* (2013.01)

(58) Field of Classification Search
CPC ..... G01M 13/00; G01M 13/02; G01M 13/021
See application file for complete search history.

(56) References Cited

U.S. PATENT DOCUMENTS

2017/0120404 A1 5/2017 Nakano
2020/0094793 A1* 3/2020 MacArthur .......... B60K 26/021

FOREIGN PATENT DOCUMENTS

| | | | | |
|---|---|---|---|---|
| CN | 106573353 | A | | 4/2017 |
| CN | 108955533 | A | | 12/2018 |
| JP | S63-288633 | A | | 11/1988 |
| JP | 2000-045731 | A | | 2/2000 |
| JP | 2002-86321 | A | | 3/2002 |
| JP | 2002086321 | A | * | 3/2002 |

(Continued)

OTHER PUBLICATIONS

Japanese Office Action received in corresponding Japanese application No. 2023-054870 dated Dec. 24, 2024 with English translation (5 pages).

(Continued)

*Primary Examiner* — Paul M. West
(74) *Attorney, Agent, or Firm* — Rankin, Hill & Clark LLP

(57) ABSTRACT

Attachment checking device for checking whether cotter and snap ring are attached to a workpiece, which includes a target component inserted through a shaft, a cotter, a retainer, and a snap ring, includes: a cotter contact portion insertable along an axial direction of the shaft from an opening in the retainer and contactable with the cotter; a holding mechanism that holds the cotter contact portion to be movable forward and backward; a retainer coupling portion that couples to the retainer when the cotter contact portion is inserted into the opening; a cotter inspector that indicates presence or absence of the cotter based on a forward or backward position of the cotter contact portion; and a snap ring inspector that inspects presence or absence of the snap ring based on a change in a coupling state of the retainer when the cotter contact portion is pulled out from the opening.

6 Claims, 8 Drawing Sheets

(56) References Cited

FOREIGN PATENT DOCUMENTS

| | | | | |
|---|---|---|---|---|
| JP | 2008-142859 | A | | 6/2008 |
| JP | 2015-158217 | A | | 9/2015 |
| JP | 2018035852 | A | * | 3/2018 |

OTHER PUBLICATIONS

Chinese Office Action received in corresponding Chinese application No. 202410192879.8 dated Aug. 8, 2026 with English translation (10 pages).

* cited by examiner

ATTACHMENT CHECKING DEVICE AND ATTACHMENT CHECKING METHOD

CROSS-REFERENCE TO RELATED APPLICATION

This application claims the benefit of foreign priority to Japanese Patent Application No. 2023-054870, filed on Mar. 30, 2023, which is incorporated by reference in its entirety.

TECHNICAL FIELD

The present invention relates to an attachment checking device and attachment checking method.

BACKGROUND

Conventionally, it is known to use locking members such as snap rings to retain and prevent detachment of target components such as gears mounted on a shaft or other workpiece. In such cases, snap rings are directly checked to be correctly fitted to the target components mounted on the workpiece using measuring instruments to prevent detachment of the target components (see, for example, JP 2008-142859 A).

In recent years, there has been a structure with an assembly configuration in which a target component mounted on a shaft of a workpiece is retained with a cotter, the cotter is covered with a retainer to prevent detachment, and the retainer is retained on the shaft with a snap ring. In such cases, when assembly is completed by attaching the retainer, the snap ring and cotter are hidden inside the retainer and cannot be visually checked. Therefore, it is conceivable to provide small window holes at the attaching sites of the snap ring and cotter to peek inside the retainer.

In this case, it is not easy to check through the small window holes whether or not the snap ring and cotter are provided at their dark attaching sites. Furthermore, a checking work using separate inspection jigs for a snap ring or a cotter is cumbersome. This is because the inspection jig for the snap ring and the inspection jig for the cotter have to be switched, resulting in a reduction in assembly work efficiency. Therefore, further improvement has been necessary.

SUMMARY

The present invention solves the above problems by providing an attachment checking device and attachment checking method capable of easily checking the attachment states of cotters and snap rings.

In order to solve the problems, one aspect of the present invention is to provide an attachment checking device that checks whether or not a cotter and a snap ring are attached to a workpiece including a target component inserted through a shaft, a cotter engaged with the shaft and the target component to restrict movement of the target component, a retainer inserted through the shaft and covered over the cotter, and a snap ring interposed between the shaft and the retainer to restrict movement of the retainer relative to the shaft. The attachment checking device includes: a cotter contact portion that is insertable along an axial direction of the shaft from an opening provided in the retainer and contactable with the cotter; a holding mechanism that holds the cotter contact portion to be movable forward and backward; a retainer coupling portion that couples to the retainer when the cotter contact portion is inserted into the opening; a cotter inspector that indicates presence or absence of the cotter based on a forward or backward position of the cotter contact portion; and a snap ring inspector that inspects presence or absence of the snap ring based on a change in a coupling state of the retainer when the cotter contact portion is pulled out from the opening.

Another aspect of the present invention is to provide a method of checking whether or not a cotter and a snap ring are attached to a workpiece including a target component inserted through a shaft, a cotter engaged with the shaft and the target component to restrict movement of the target component, a retainer inserted through the shaft and covered over the cotter, and a snap ring interposed between the shaft and the retainer to restrict movement of the retainer relative to the shaft. The method includes the steps of: advancing a cotter contact portion that stops upon contacting the cotter and checking presence or absence of the cotter based on a stopping position of the cotter contact portion; and bringing a retainer coupling portion into contact with the retainer when advancing the cotter contact portion, resulting in a coupling state, and inspecting presence or absence of the snap ring based on a change in a coupling state of the retainer relative to the retainer coupling portion when retracting the cotter contact portion.

BRIEF DESCRIPTION OF THE DRAWINGS

The drawings described herein are for illustration purposes only and are not intended to limit the scope of the present invention in any way.

DETAILED DESCRIPTION

Embodiment 1

Figure 1:
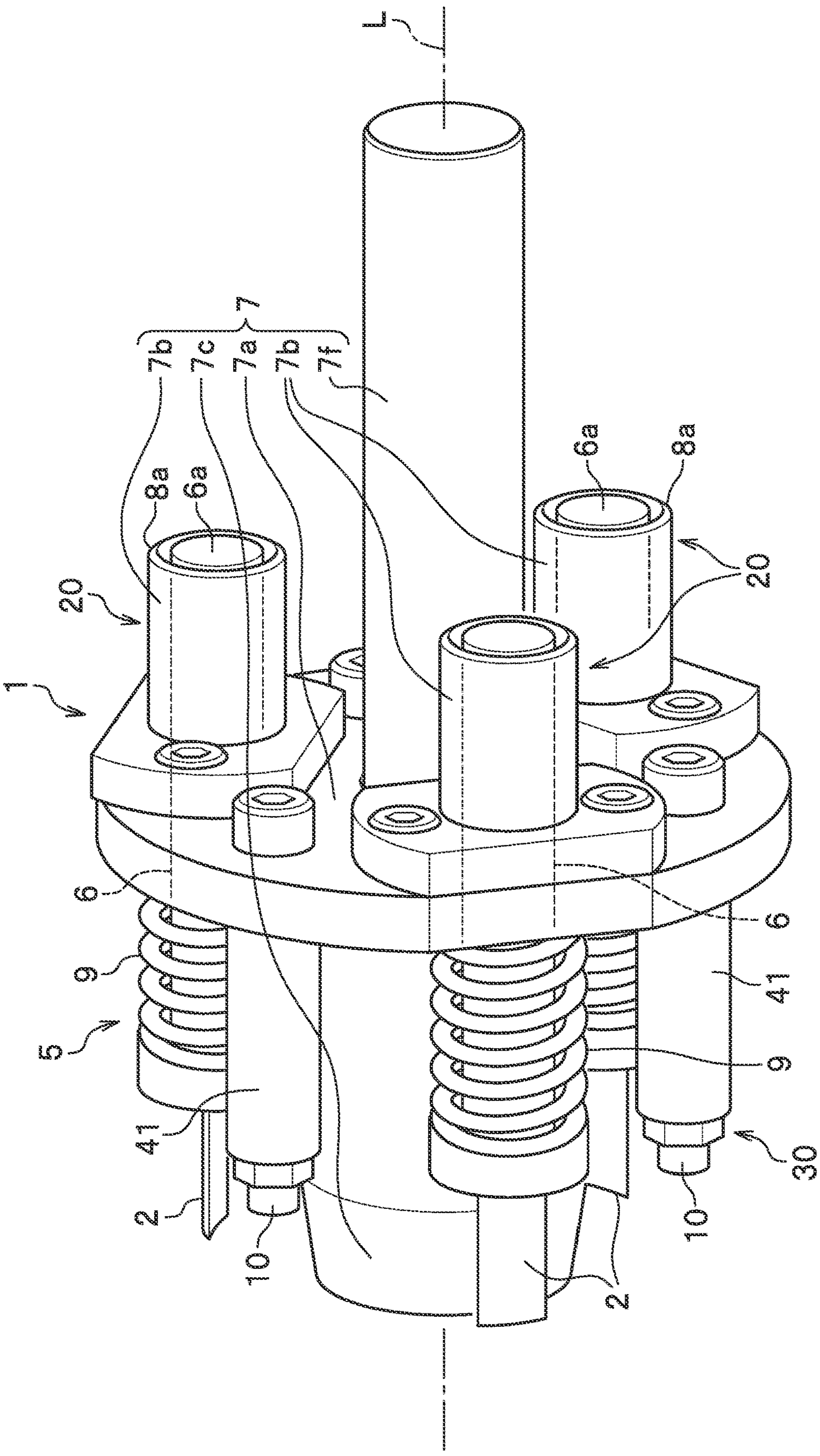
FIG. 1 is a perspective view showing an overall configuration of an attachment checking device according to Embodiment 1 of the present invention.

An embodiment of the present invention will be described below with reference to the drawings as appropriate. The same constituent elements are assigned the same reference numerals, and duplicate descriptions are omitted. In the description, the same elements are assigned the same numbers, and duplicate descriptions are omitted. When describing directions, the direction along the axis L shown in FIG. 6 in which a cotter contact portion 2 is inserted into an opening 104*a* is referred to as a forward direction, and the direction in which the cotter contact portion 2 is pulled out is referred to as a backward direction.

FIG. 1 shows an attachment checking device 1 according to Embodiment 1 of the present invention. The attachment checking device 1 is a device that checks whether or not a cotter 103 and a snap ring 105 are attached to a workpiece 100 shown in FIG. 3.

First, the configuration of the workpiece 100 as an inspection target will be described. The workpiece 100 includes a gear 102 as a target component inserted through a shaft 101, and a cotter 103 that engages with the shaft 101 and the gear 102 to restrict movement of the gear 102. Further, the workpiece 100 includes a retainer 104 inserted through the shaft 101 and covered over the cotter 103, and a snap ring 105 interposed between the shaft 101 and the retainer 104 to restrict movement of the retainer 104 relative to the shaft 101.

The shaft 101 in Embodiment 1 is an output shaft of a transmission (not shown). The shaft 101 transmits rotational driving force generated by an engine or motor to other components of the driving system. Further, the target component is not limited to the gear 102. For example, the target component may be a pulley or the like as long as it is inserted through the shaft 101.

The shaft 101 has a large diameter portion 101*a* on the transmission side and a small diameter portion 101*b* having a smaller diameter than the large diameter portion 101*a* and inserted into the axial hole of the gear 102. Further, a center hole 101*c* to guide insertion of the attachment checking device 1 along the axis L direction is formed to open at the end of the small diameter portion 101*b*. A recessed groove 101*d* is also annularly formed in the outer peripheral surface of the small diameter portion 101*b*. Furthermore, the outer peripheral surface of the small diameter portion 101*b* of the shaft 101 and the inner peripheral surface of the gear 102 are spline-fitted.

Figure 3:
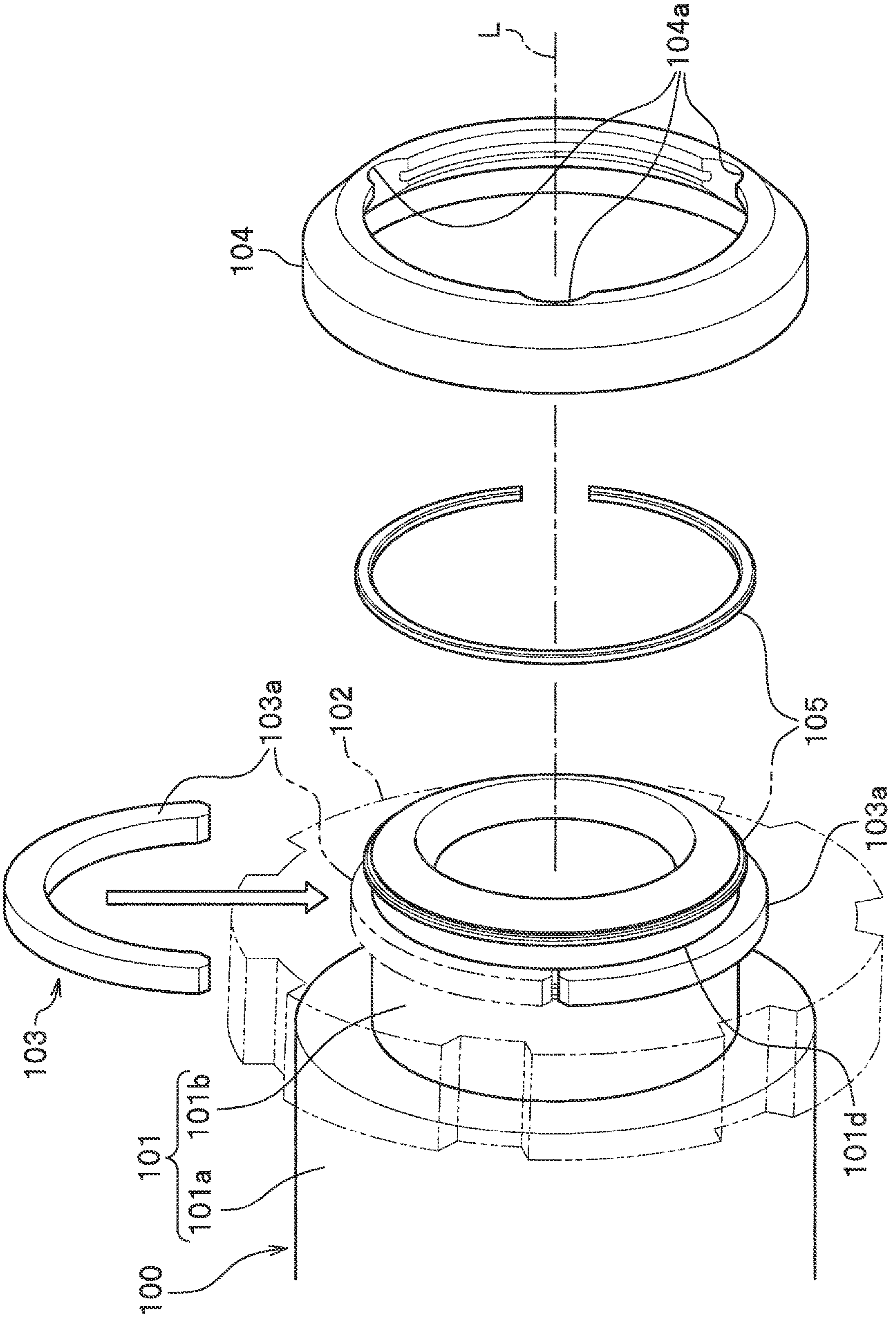
FIG. 3 is an exploded perspective view for explaining a configuration of a workpiece checked by the attachment checking device.

As shown in FIG. 3, the cotter 103 is an annular member formed by combining a pair of arc-shaped components 103*a*. Each arc-shaped component 103*a* is radially outwardly engaged with the recessed groove 101*d* of the small diameter portion 101*b*. Thereby, the annular cotter 103 engaged with the shaft 101 is projected outward in cross section to contact the side surface 102*a* (see FIG. 7) of the gear 102 to restrict movement of the gear 102 in the axis L direction. Therefore, if the cotter 103 is attached, the gear 102 does not come off the shaft 101.

Figure 4:
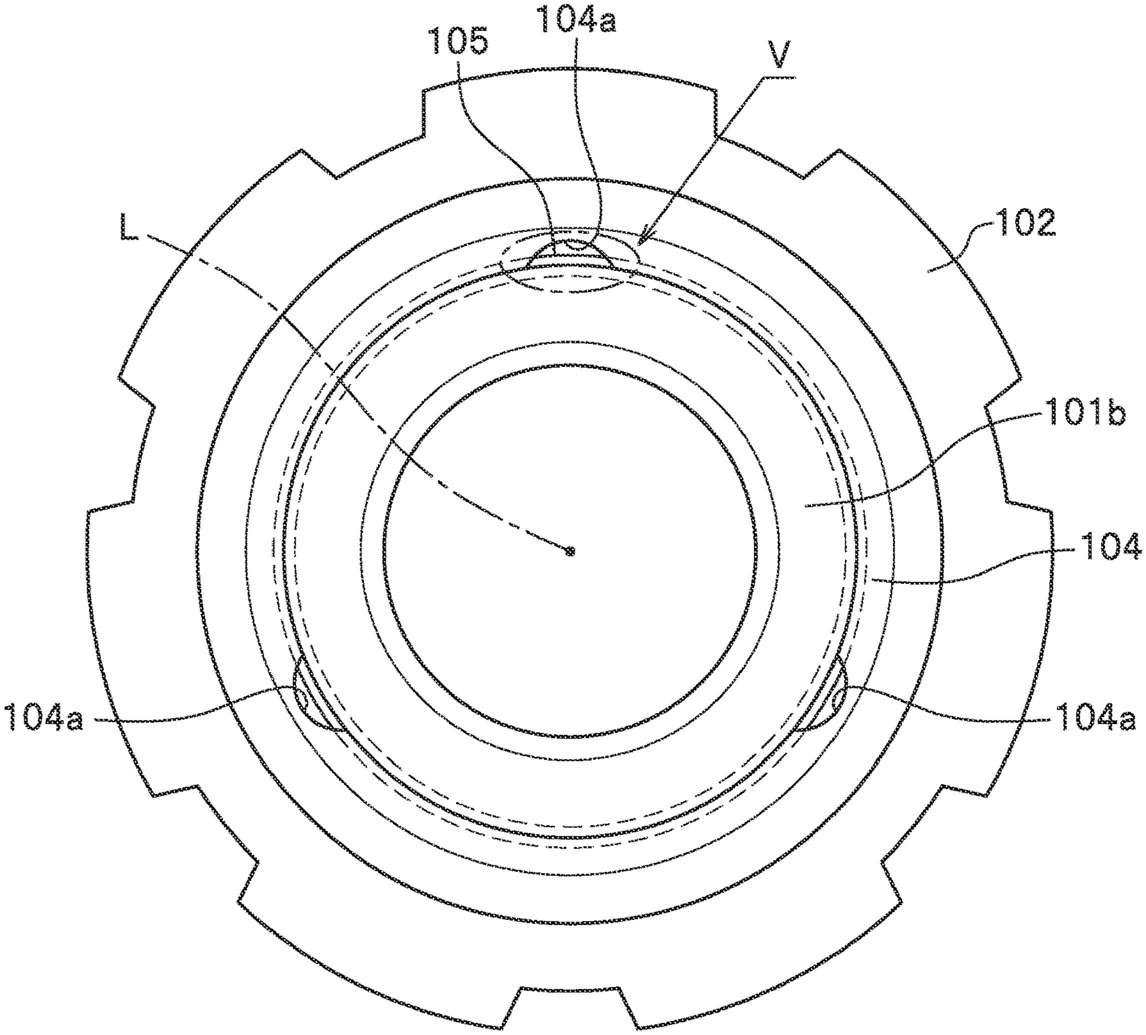
FIG. 4 is a front view of the workpiece seen from an opening side.
Figure 7:
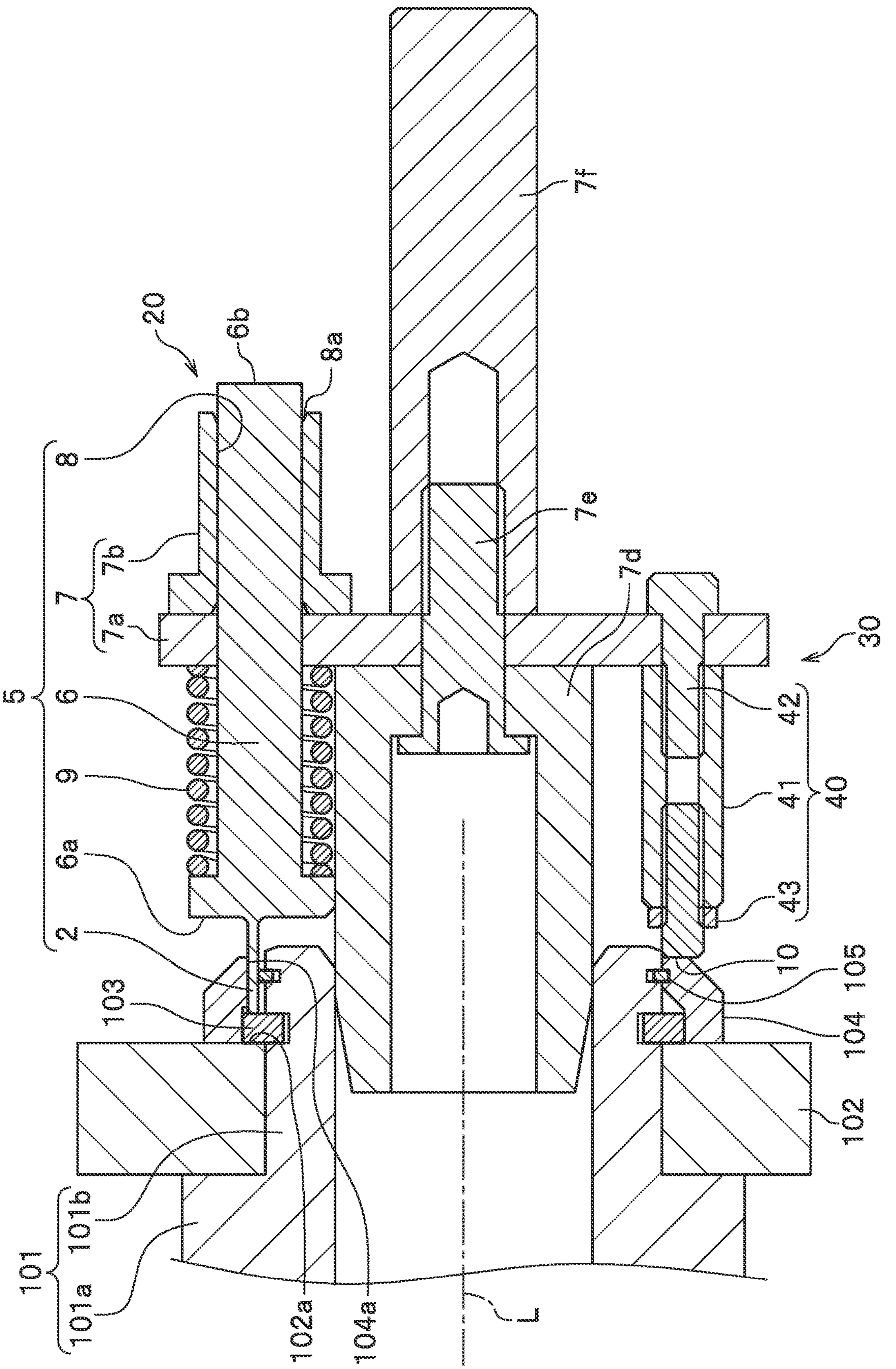
FIG. 7 is a vertical cross-sectional view of the attachment checking device inserted into a workpiece with an attached cotter.

The retainer 104 has an annular shape (see FIG. 4). Further, three semicircular openings 104*a* are formed in the inner peripheral surface of the retainer 104 at equal intervals. The retainer 104 is inserted through the small diameter portion 101*b* from the axis L direction so as to be covered over the outer side in the radial direction of the cotter 103 and mounted on the shaft 101. As shown in FIG. 7, the opening 104*a* communicates along the axis L direction from the end of the retainer 104 to the portion where the cotter 103 is attached. In other words, the inner peripheral surface of the semicircular opening 104*a* is located radially outward from the outer peripheral surface of the snap ring 105.

As shown in FIG. 3, the snap ring 105 is an annular member. The snap ring 105 is configured to be radially elastically deformable with a discontinuous notch formed in a part of the circumference. The snap ring 105 is mounted in a groove portion (see FIG. 7) recessedly formed in the outer peripheral surface of the small diameter portion 101*b*, engages the radially inner peripheral edge, and is attached to the shaft 101. Further, the radially outer peripheral edge of the snap ring 105 is engaged by being mounted in a groove portion recessedly formed in the inner peripheral surface of the retainer 104. Then, the snap ring 105 is interposed between the shaft 101 and the retainer 104 to restrict movement of the retainer 104 relative to the shaft 101. Thereby, the snap ring 105 retains the retainer 104 covered over the cotter 103 to prevent detachment of the cotter 103.

Figure 5:
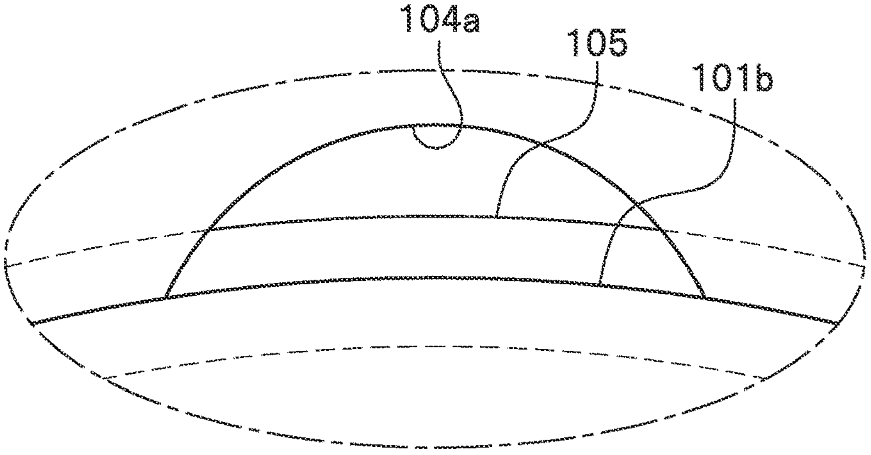
FIG. 5 is an enlarged front view of the opening of the workpiece.

As shown in FIG. 5, when the snap ring 105 is interposed and assembled between the shaft 101 and the retainer 104, in the opening 104*a* of the retainer 104, a gap is formed between the inner peripheral surface of the opening 104*a* and the outer peripheral surface of the snap ring 105 in the radial direction. Therefore, the cotter contact portion 2 is configured so that it can be inserted through the opening 104*a* and pass outside the outer peripheral circle of the snap ring 105 along the axis L direction to reach the point where the cotter 103 is attached (see FIG. 7).

Next, the configuration of the attachment checking device 1 according to Embodiment 1 will be described.

As shown in FIG. 1, the attachment checking device 1 according to Embodiment 1 includes a main body portion 7, a cotter contact portion 2 provided in the main body portion 7, and a holding mechanism 5 that holds the cotter contact portion 2 to be movable forward and backward relative to the main body portion 7.

Of these components, the main body portion 7 mainly includes a disk-shaped base member 7*a*, a round bar-shaped handle portion 7*f* provided on the rear center front side surface of the base member 7*a* and gripped by a worker performing inspection work, and a tapered insertion guide pin 7*c* provided on the front center side surface of the base member 7*a* and inserted into the center hole 101*c* (see FIG. 6) of the workpiece 100. Further, the main body portion 7 has three cylindrical slide guide members 7*b* arranged on the circumference at predetermined intervals around the handle portion 7*f* on the rear side.

Figure 2:
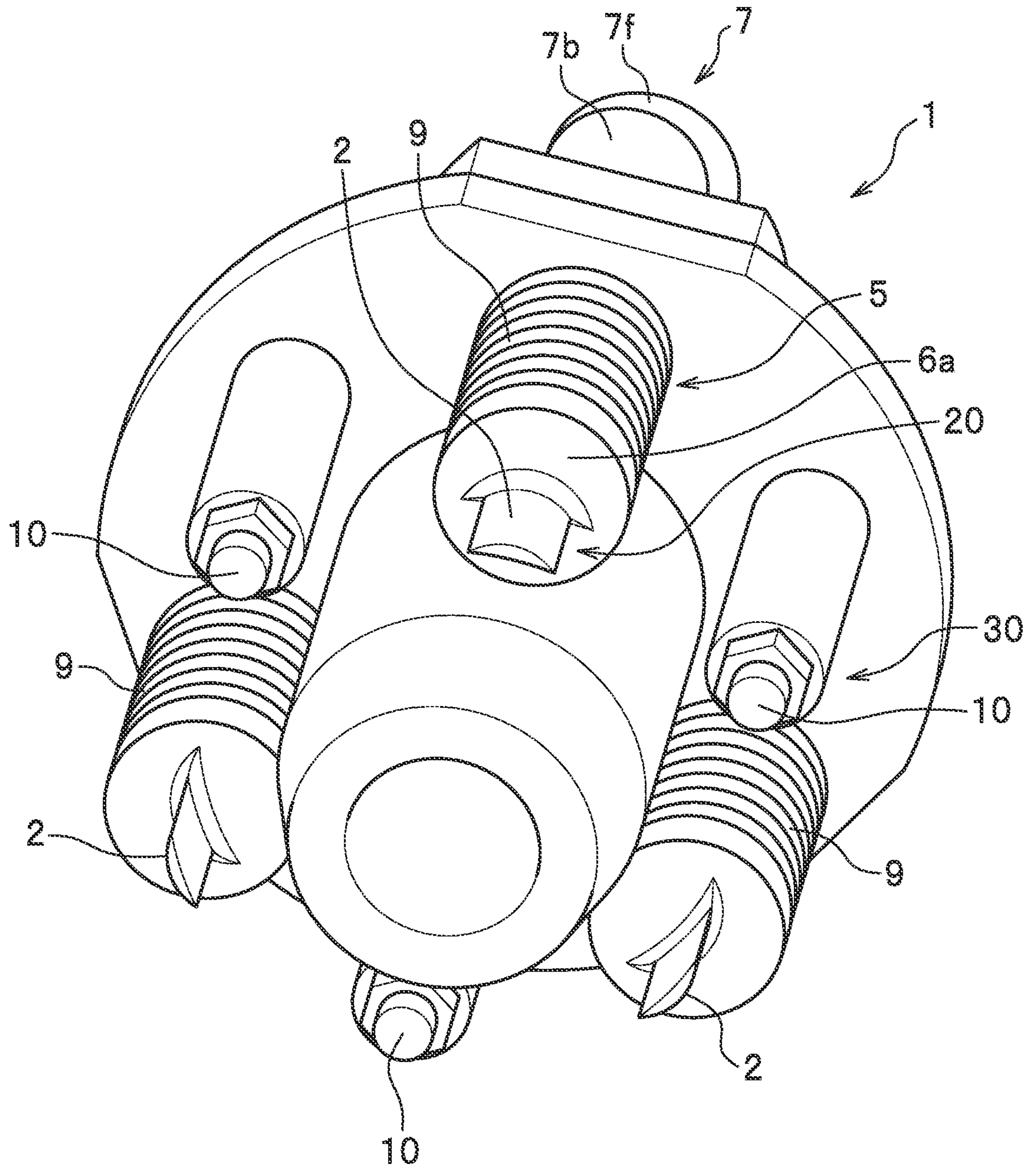
FIG. 2 is a perspective view showing a configuration of a cotter contact portion of the attachment checking device according to Embodiment 1.

Further, as shown in FIG. 2, the cotter contact portion 2 has an arcuate cross-sectional shape with an outer diameter equal to or smaller than the inner diameter dimension of the opening 104*a* (see FIG. 4). Thereby, the distal end portion of the cotter contact portion 2 can be inserted from the opening 104*a* (see FIG. 6) provided in the retainer 104 along the axis L direction of the shaft 101 through the outer side in the radial direction of the snap ring 105.

Then, the cotter contact portion 2 is set to have a predetermined height dimension along the axis L direction (see FIG. 7) so that the end surface of the distal end portion can contact the cotter 103 attached to the small diameter portion 101*b*.

As shown in FIG. 7, the holding mechanism 5 includes a round bar-shaped rod member 6 having the cotter contact portion 2 provided at one end side 6*a* thereof, and a through hole 8. The through hole 8 is formed in an annular hole shape by penetrating the base member 7*a* and each of the three slide guide members 7*b* provided on the circumference along the axis L direction. Three rod members 6 are provided in Embodiment 1. Each rod member 6 is slidably housed in the through hole 8.

Further, the holding mechanism 5 in Embodiment 1 is provided with a spring 9 (see FIG. 2) as a biasing unit that biases the cotter contact portion 2 toward the one end side 6*a* in each rod member 6.

The spring 9 in Embodiment 1 has its front end connected to the rear side of the flange-shaped one end side 6*a* and its rear end connected to the peripheral edge of the through hole 8 opening in the front side surface of the base member 7*a*.

Thereby, in an unloaded state, the spring 9 holds the position of the one end side 6*a* of the rod-shaped member 6 aligned with the position of a retainer coupling portion 10 to be described later in the axis L direction.

Further, the cotter contact portion 2 projects forward along the axis L direction (see FIG. 7) from the one end side 6*a* by a predetermined dimension.

In Embodiment 1, before the retainer coupling portion 10 contacts the retainer 104, the front end of the cotter contact portion 2 contacts the cotter 103 to compress the spring 9 along the axis L direction. Further, if the cotter 103 is not attached to the shaft 101 (see FIG. 8), the front end of the cotter contact portion 2 does not get over the cotter 103 even if the retainer coupling portion 10 contacts the retainer 104. This is because the cotter 103 is not attached. Thus, if the cotter 103 is not attached, the attachment checking device 1 according to Embodiment 1 sets the projecting dimension of the cotter contact portion 2 such that the spring 9 remains uncompressed in an unloaded state even if the retainer coupling portion 10 contacts the retainer 104.

Figure 6:
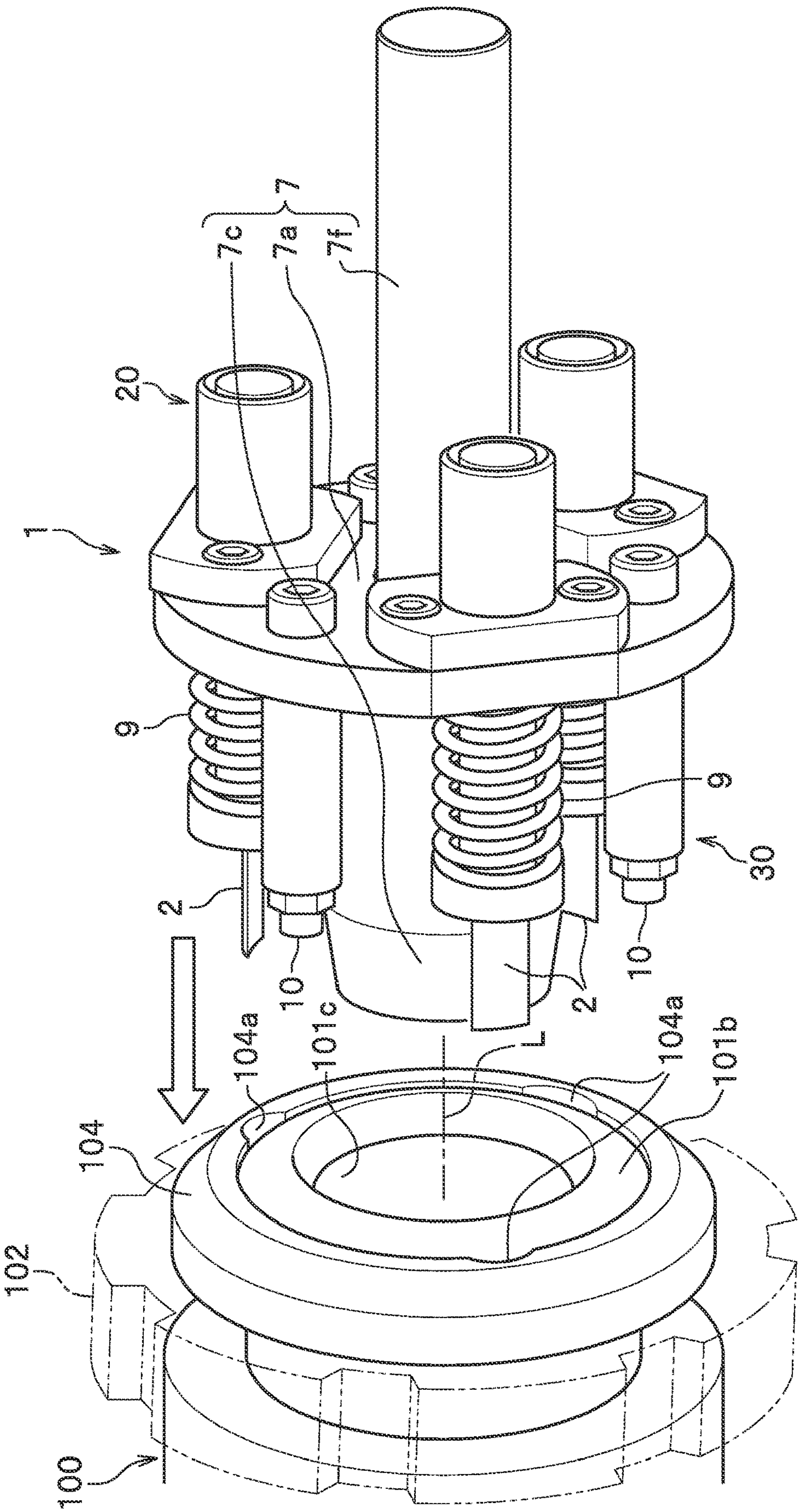
FIG. 6 is a perspective view for explaining a state of inserting the attachment checking device into the workpiece.

Then, as shown in FIG. 2, each set of the cotter contact portions 2, the holding mechanism 5, and a cotter inspector 20 of the attachment checking device 1 is provided at the corresponding position of the plurality (see FIG. 4) of openings 104*a* (see FIG. 6). When the retainer coupling portion 10 contacts the retainer 104, the cotter inspector 20 inspects the presence or absence of the cotter 103 depending on whether or not the other end side 6*b* of the rod-shaped member 6 protrudes from the through hole 8.

For example, as shown in FIG. 7, when the front end of the cotter contact portion 2 contacts the cotter 103 attached to the small diameter portion 101*b*, the spring 9 is compressed along the axis L direction to move back the rod-shaped member 6 in the through hole 8. Since the other end side 6*b* of the rod-shaped member 6 protrudes from the rear opening 8*a* of the through hole 8, the cotter inspector 20 can indicate that the cotter 103 is attached to the shaft 101.

Figure 8:
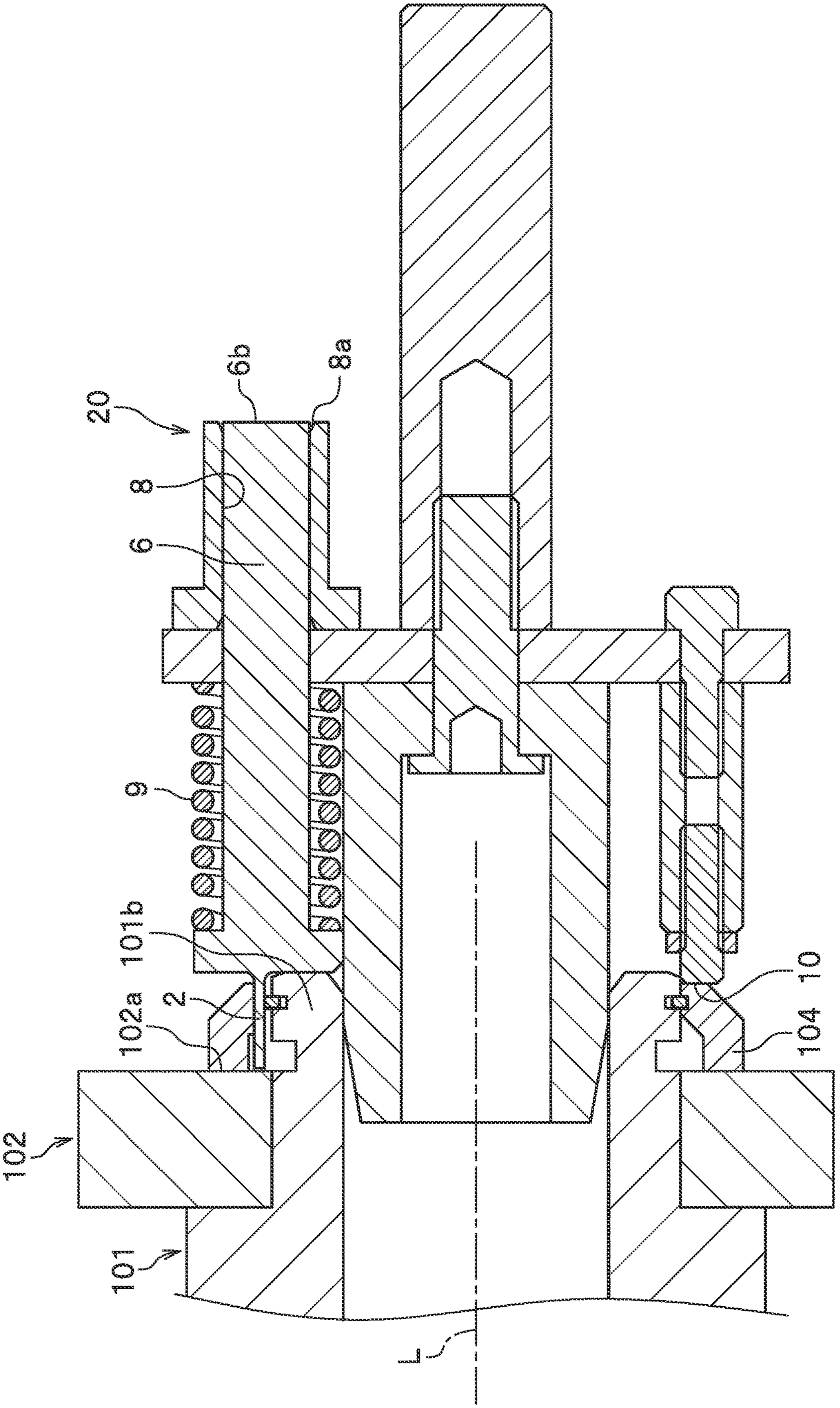
FIG. 8 is a vertical cross-sectional view of the attachment checking device inserted into a workpiece without a cotter.

Further, as shown in FIG. 8, if the cotter 103 is not attached to the shaft 101, the rod-shaped member 6 in the through hole 8 does not move. Therefore, the other end side 6*b* of the rod-shaped member 6 does not protrude from the rear opening 8*a* of the through hole 8. Thereby, the cotter inspector 20 can indicate that the cotter 103 is not attached to the shaft 101 and make the worker recognize the need for reassembly.

Furthermore, the attachment checking device 1 includes a snap ring inspector 30 that inspects the presence or absence of the snap ring 105 when the cotter contact portion 2 is pulled out from the opening 104*a*, based on a change in the coupling state of the retainer 104.

The retainer coupling portion 10 in Embodiment 1 has a permanent magnet that attracts (couples to) the metallic retainer 104 at the front end of the shaft portion. When the cotter contact portion 2 is inserted into the opening 104*a*, the retainer coupling portion 10 to have approached or contacted the metallic retainer 104, can couple to the metallic retainer 104 by magnetic force.

As shown in FIG. 7, the snap ring inspector 30 includes an adjustment mechanism 40 that adjusts the amount of protrusion of the retainer coupling portion 10 from the main body portion 7.

Specifically, the adjustment mechanism 40 includes a columnar member 41 projecting forward from the base member 7*a* and fixed by a bolt 42, and a fastening nut 43 that fixes the retainer coupling portion 10 to the columnar member 41. The shaft portion of the retainer coupling portion 10 is formed with a male threaded portion. The retainer coupling portion 10 is fixed by screwing the male threaded portion into a female threaded portion formed inside the columnar member 41 by a predetermined amount and tightening the fastening nut 43.

The adjustment mechanism 40 configured as described above can adjust the position in the axis L direction of the permanent magnet at the front end of the shaft portion by changing the screwed amount of the shaft portion screwed in the axial direction into the columnar member 41.

Therefore, the position of the retainer coupling portion 10 adjusted by the adjustment mechanism 40 can be set so that the distal end of the cotter contact portion 2 does not bottom against the side surface of the gear 102 if the cotter 103 is not attached (see FIG. 8). Therefore, in case the cotter 103 is not attached, it is possible to reliably prevent the cotter contact portion 2 from retracting and thus erroneously indicating that the cotter 103 is attached even if the cotter 103 is not attached.

Then, the snap ring inspector 30 has the retainer coupling portion 10 at one end side of the columnar member 41. Therefore, the amount of protrusion of the retainer coupling portion 10 can further be easily set by adjusting the axial dimension of the columnar member 41.

Next, a method of checking whether or not the cotter 103 and snap ring 105 are attached to the workpiece 100 will be described. The attachment checking method uses the attachment checking device 1 of Embodiment 1.

First, as shown in FIG. 3, the workpiece 100 is assembled. As shown in FIG. 4, the gap formed between the inner wall of the retainer 104 and the small diameter portion 101*b* is generally dark, and it is difficult for a worker to visually check whether or not the cotter 103 or the snap ring 105 is attached inside the retainer 104.

As shown in FIG. 6, in the attachment checking device 1 of Embodiment 1, the attachment checking device 1 including the cotter contact portion 2 is advanced along the axis L direction. Thereby, while the insertion guide pin 7*c* is guided by the center hole 101*c* of the small diameter portion 101*b*, the cotter contact portions 2 are inserted into the respective three openings 104*a*.

As shown in FIGS. 7 and 8, the stopping positions of the cotter contact portion 2 in the forward direction differ depending on whether or not the cotter 103 is attached. Therefore, the attachment checking device 1 checks the presence or absence of the cotter 103 based on the stopping position of the cotter contact portion 2. At the same time, when the cotter contact portion 2 is advanced, the retainer coupling portion 10 is brought into contact with the retainer 104, resulting in a coupling state.

Figure 9:
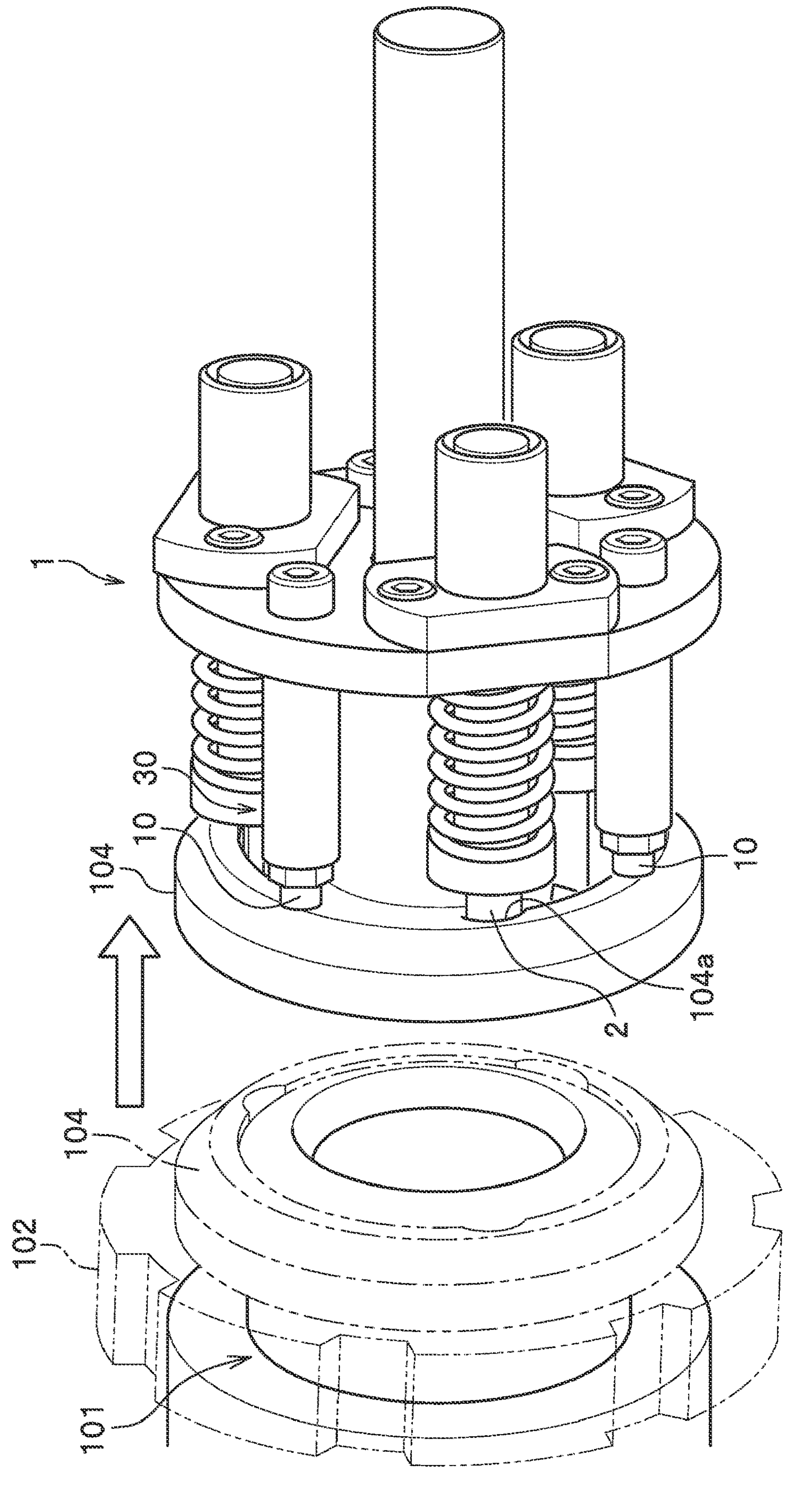
FIG. 9 is a perspective view showing a state of pulling the attachment checking device out from a workpiece without a cotter.

As shown in FIG. 9, when the cotter contact portion 2 is retracted, the presence or absence of the snap ring 105 is inspected based on the change in the coupling state of the retainer 104 relative to the retainer coupling portion 10. For example, if the retainer 104 is detached from the shaft 101 as shown by the solid lines in FIG. 9, the snap ring 105 is not attached. If the retainer 104 remains on the shaft 101 as shown by the imaginary lines in FIG. 9, it can be checked that the snap ring 105 is attached.

As described above, in the attachment checking method that uses the attachment checking device 1 of Embodiment 1, the cotter contact portion 2 and the retainer coupling portion 10 are reciprocated once in the forward and backward directions. Thereby, checking of whether or not the cotter 103 is attached and inspection of whether or not the snap ring 105 is attached can be performed at the same time. Therefore, as compared with a checking work using a separate inspection jig for the snap ring 105 and a separate inspection jig for the cotter, the attachment checking method of Embodiment 1 can allow for an easy checking work.

Therefore, the worker can easily inspect the workpiece 100 and easily determine whether or not reassembly is necessary, thereby improving assembly work efficiency.

As described above, the embodiment provides, as shown in FIG. 3, an attachment checking device 1 (see FIG. 1) that checks whether or not a cotter 103 and a snap ring 105 are attached to a workpiece 100. The workpiece 100 includes a gear 102 as a target component inserted through a shaft 101, a cotter 103 engaging with the shaft 101 and a gear 102 to restrict movement of the gear 102, a retainer 104 inserted through the shaft 101 and covered over the cotter 103, and a snap ring 105 interposed between the shaft 101 and the retainer 104 to restrict movement of the retainer 104 relative to the shaft 101.

The attachment checking device 1 includes a cotter contact portion 2 that is insertable along the axis L direction of the shaft 101 from an opening 104*a* provided in the retainer 104 and contactable with the cotter 103, a holding mechanism 5 that holds the cotter contact portion 2 to be movable forward and backward, a retainer coupling portion 10 that couples to the retainer 104 when the cotter contact portion 2 is inserted into the opening 104*a*, and a cotter inspector 20 that indicates presence or absence of the cotter 103 based on the forward or backward position of the cotter contact portion 2.

Further, the attachment checking device 1 includes a snap ring inspector 30 that inspects presence or absence of the snap ring 105 based on a change in a coupling state of the retainer 104 when the cotter contact portion 2 is pulled out from the opening 104*a*.

The attachment checking device 1 of Embodiment 1 configured as described above can easily check the attachment states of the cotter 103 and snap ring 105.

Specifically, as shown in FIG. 6, the cotter contact portion 2 of the attachment checking device 1 is inserted in the forward direction along the axis L direction of the shaft 101 from the opening 104*a* provided in the retainer 104. The cotter contact portion 2 is held by the holding mechanism 5 to be movable forward and backward.

Therefore, as shown in FIG. 7, if the cotter 103 is attached by engaging with the shaft 101 and the gear 102, the cotter contact portion 2 to be inserted from the opening 104*a* stops upon contacting the cotter 103.

Further, as shown in FIG. 8, if the cotter 103 is not attached, the cotter contact portion 2 moves further in the forward direction without stopping. Therefore, the cotter inspector 20 can indicate the presence or absence of the cotter 103 based on the forward or backward stopping position of the cotter contact portion 2.

Furthermore, when the cotter contact portion 2 is inserted into the opening 104*a*, the retainer coupling portion 10 of the attachment checking device 1 couples to the retainer 104. Then, when the cotter contact portion 2 is pulled out from the opening 104*a*, the snap ring inspector 30 can inspect the presence or absence of the snap ring 105 based on a change in the coupling state of the retainer 104 relative to the retainer coupling portion 10.

That is, if the snap ring 105 is interposed and attached between the shaft 101 and the retainer 104, the retainer 104 does not come off since it is fixed to the shaft 101 by the snap ring 105. Therefore, the magnetic force of the retainer coupling portion 10 fails to resist the pulling force, and only the retainer coupling portion 10 retracts, leaving the retainer 104 on the shaft 101.

Further, as shown in FIG. 9, when the snap ring 105 is not attached, the retainer 104, which has not been fixed to the shaft 101, disengages (comes off) from the shaft 101. The retainer 104 retracts together with the retainer coupling portion 10, while the retainer coupling portion 10 attracting (coupling to) the retainer 104. Therefore, the snap ring inspector 30 can inspect the presence or absence of the snap ring 105 based on the change in the coupling state as to whether or not the retainer 104 has come off.

As shown in FIG. 7, the holding mechanism 5 includes a rod-shaped member 6 having the cotter contact portion 2 provided at one end side 6*a* thereof and a main body portion 7 having a through hole 8 into which the rod-shaped member 6 is inserted, and a spring 9 as a biasing unit that biases the cotter contact portion 2 toward the one end side 6*a*.

When the retainer coupling portion 10 contacts the retainer 104, the cotter inspector 20 inspects the presence or absence of the cotter 103 depending on whether or not the other end side 6*b* of the rod-shaped member 6 protrudes from the through hole 8.

The spring 9 biases the cotter contact portion 2 toward the one end side 6*a* of the rod-shaped member 6. Therefore, as shown in FIG. 7, if the cotter 103 is attached, the cotter contact portion 2 contacts the cotter 103 to move back the rod-shaped member 6 in the through hole 8 against the biasing force of the spring 9 and causes the other end side 6*b* to protrude from the rear opening 8*a* of the through hole 8.

Further, as shown in FIG. 8, if the cotter 103 is not attached to the small diameter portion 101*b* of the shaft 101, even when the retainer coupling portion 10 advances to a position where it contacts with the retainer 104, the cotter contact portion 2 advances as it is. Because the rod-shaped member 6 does not retract in the through hole 8, the other end side 6*b* of the rod-shaped member 6 does not protrude from the rear opening 8*a*.

Therefore, the cotter inspector 20 can inspect the presence or absence of the cotter 103 depending on whether or not the other end side 6*b* of the rod-shaped member 6 protrudes from the through hole 8.

As shown in FIG. 3, the cotter 103 is an annular member formed by combining a plurality of, in the embodiment, a pair of arc-shaped components 103*a*. Further, the retainer 104 has a plurality of circumferentially arranged, three in the embodiment, openings 104*a* arranged on the circumference at equal intervals.

Then, as shown in FIG. 2, each set of the cotter contact portions 2, the holding mechanism 5, and the cotter inspector 20 of the attachment checking device 1 is provided at the corresponding position of the plurality (see FIG. 4) of openings (see FIG. 6).

For example, even if any of the cotter contact portions 2 falls between the adjacent arc-shaped components 103*a*, any of the other cotter contact portions 2 provided corresponding to each opening 104*a* contacts the cotter 103. Therefore, it is possible to reliably recognize that the cotter 103 is attached. Then, as for the cotter 103 composed of a pair of arc-shaped components 103*a* and 103*a*, if only one arc-shaped component 103*a* is forgotten to be attached, the two cotter contact portions 2 do not move backward. Therefore, it is possible to recognize the forgotten attachment and take measures such as reassembly.

Further, as shown in FIG. 2, the cotter 103 has a plurality of arc-shaped components 103*a* engaged with the shaft 101 and combined to form an annular member. Therefore, the annular cotter 103 can be assembled by engaging the arc-shaped components 103*a* with the shaft 101 from the radially outer side, respectively.

Further, as shown in FIG. 7, the snap ring inspector 30 includes an adjustment mechanism 40 that adjusts the amount of protrusion of the retainer coupling portion 10 from the main body portion 7.

The amount of protrusion of the retainer coupling portion 10 can be adjusted by the adjustment mechanism 40, so that if the cotter is not attached (see FIG. 8), it is possible to set the distal end of the cotter contact portion 2 so as not to bottom against the side surface of the gear 102. Therefore, it is possible to prevent the cotter contact portion 2 from retracting and thus erroneously indicating that the cotter 103 is attached.

The snap ring inspector 30 has the retainer coupling portion 10 at one end side of the columnar member 41. Therefore, it is easy to set the amount of protrusion of the retainer coupling portion 10.

Further, as shown in FIG. 3, the attachment checking method includes checking whether or not a cotter 103 and a snap ring 105 are attached to a workpiece 100, which includes a gear 102 inserted through a shaft 101, a cotter 103 engaging with the shaft 101 and a gear 102 to restrict movement of the gear 102, a retainer 104 inserted through the shaft 101 and covered over the cotter 103, and a snap ring 105 interposed between the shaft 101 and the retainer 104 to restrict movement of the retainer 104 relative to the shaft 101.

As shown in FIG. 6, the attachment checking method of the embodiment includes the step of advancing a cotter contact portion 2 that stops upon contacting the cotter 103 and checking the presence or absence of the cotter 103 based on a stopping position of the cotter contact portion 2. At the same, when the cotter contact portion 2 is advanced, the retainer coupling portion 10 is brought into contact with the retainer 104, resulting in a coupling state. The attachment checking method further includes the step of inspecting presence or absence of the snap ring based on a change in the coupling state of the retainer 104 relative to the retainer coupling portion 10 when retracting the cotter contact portion 2.

As described above, according to the attachment checking method using the attachment checking device 1, reciprocating the cotter contact portion 2 and the retainer coupling portion 10 once in the forward and backward directions allows for the checking of whether or not the cotter 103 is attached and the inspection of whether or not the snap ring 105 is attached at the same time. Therefore, as compared with the checking work using separate inspection jigs for the snap ring 105 or the cotter 103, practical and advantageous effects can be obtained. These include easier checking work and improved assembly work efficiency.

The present invention is not limited to the above-described embodiment but may be modified in various kinds of manners. The above-described embodiment is exemplarily described to facilitate understanding of the present invention and is not necessarily limited to a configuration including all described components. Any component according to an embodiment may be replaced with a component according to another embodiment, and a component according to an embodiment may be added to a component according to another embodiment. Moreover, any component according to each embodiment may be deleted or another component may be added or replaced. Possible modifications of the above-described embodiment are as follows, for example.

In the embodiment, the output shaft of the transmission has been described as an example of the shaft 101. However, the shaft 101 is not limited to this specific application. For example, the shaft may be a power shaft, such as an input shaft of a transmission, a motor shaft, or an engine output shaft. In other words, any shaft may be applicable as long as it transmits rotational driving force using an inserted target component.

The embodiment has been described in a case where the retainer coupling portion 10 has a permanent magnet. However, the retainer coupling portion 10 is not particularly limited to this specific configuration. For example, coupling may be performed by suction using air or adhesion. That is, any shape, quantity, and manner of coupling of the retainer coupling portion 10 may be adopted as long as it enables disengagement (coming off) from the retainer 104 due to a coupling force smaller than the locking force of the snap ring.

What is claimed is:

1. An attachment checking device that checks whether or not a cotter and a snap ring are attached to a workpiece including a target component having a shaft inserted therethrough, a cotter engaged with the shaft and the target component to restrict movement of the target component, a retainer having the shaft inserted therethrough and covered over the cotter, and a snap ring interposed between the shaft and the retainer to restrict movement of the retainer relative to the shaft, the attachment checking device comprising:

- a cotter contact portion that is insertable along an axial direction of the shaft from an opening provided in the retainer and contactable with the cotter;
- a holding mechanism that holds the cotter contact portion to be movable forward and backward;
- a retainer coupling portion that couples to the retainer when the cotter contact portion is inserted into the opening;
- a cotter inspector that indicates presence or absence of the cotter based on a forward or backward position of the cotter contact portion; and
- a snap ring inspector that inspects presence or absence of the snap ring based on a change in a coupling state of the retainer when the cotter contact portion is pulled out from the opening.

2. The attachment checking device according to claim 1, wherein

- the holding mechanism includes a rod-shaped member having the cotter contact portion provided at one end side thereof, a main body portion having a through hole into which the rod-shaped member is inserted, and a biasing unit that biases the cotter contact portion toward the one end side, and
- the cotter inspector inspects presence or absence of the cotter depending on whether or not another end side of the rod-shaped member protrudes from the through hole when the retainer coupling portion contacts the retainer.

3. The attachment checking device according to claim 2, wherein

- the snap ring inspector includes an adjustment mechanism that adjusts an amount of protrusion of the retainer coupling portion from the main body portion.

4. The attachment checking device according to claim 2, wherein

- the snap ring inspector has the retainer coupling portion at one end side of the rod-shaped member.

5. The attachment checking device according to claim 1, wherein

- the cotter is an annular member formed by combining a plurality of arc-shaped components,
- the retainer has a plurality of the openings arranged on a circumference, and a set of the cotter contact portion, the holding mechanism, and the cotter inspector is provided at a position corresponding to the plurality of openings.

6. A method of checking whether or not a cotter and a snap ring are attached to a workpiece including a target component having a shaft inserted therethrough, a cotter engaged with the shaft and the target component to restrict movement of the target component, a retainer having the shaft inserted therethrough and covered over the cotter, and a snap ring interposed between the shaft and the retainer to restrict movement of the retainer relative to the shaft, the method comprising the steps of:

advancing a cotter contact portion that stops upon contacting the cotter and checking presence or absence of the cotter based on a stopping position of the cotter contact portion; and bringing a retainer coupling portion into contact with the retainer when advancing the cotter contact portion, resulting in a coupling state, and inspecting presence or absence of the snap ring based on a change in a coupling state of the retainer relative to the retainer coupling portion when retracting the cotter contact portion.

* * * * *